March 26, 1963   H. W. BROWN ET AL   3,083,309
THERMAL MOTOR PROTECTIVE MEANS
Filed May 27, 1960   2 Sheets-Sheet 1
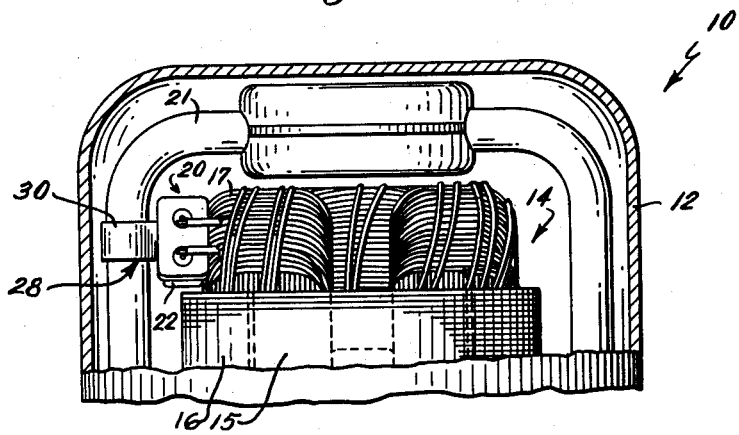
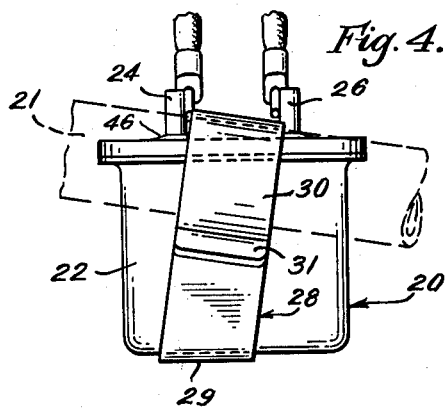
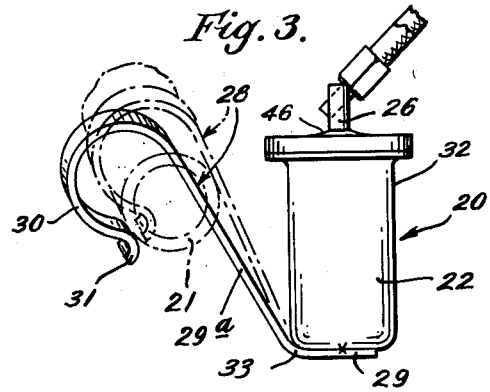
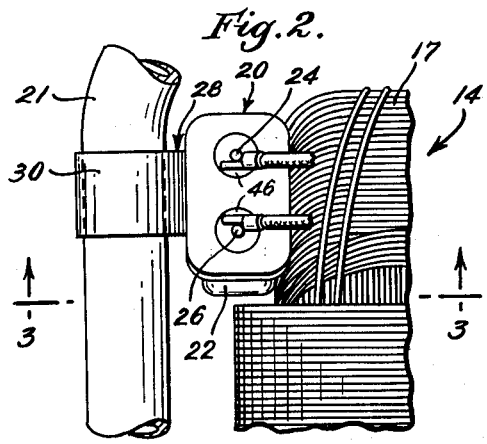
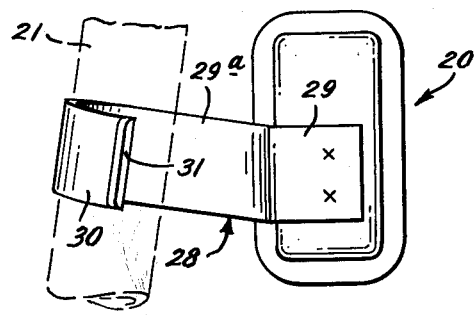
Inventors:
Harry W. Brown,
Thomas A. Jacoby,
Curtis F. Kruger,
by Harold Levine Att'y.

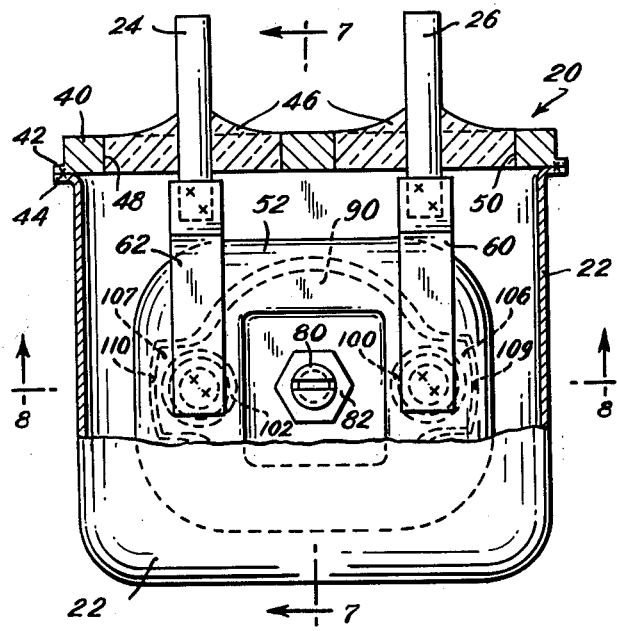

United States Patent Office 3,083,309
Patented Mar. 26, 1963

3,083,309
THERMAL MOTOR PROTECTIVE MEANS
Harry W. Brown and Thomas A. Jacoby, Tecumseh, Mich., and Curtis F. Kruger, North Attleboro, Mass., assignors to Texas Instruments Incorporated, Dallas, Tex., a corporation of Delaware
Filed May 27, 1960, Ser. No. 32,455
12 Claims. (Cl. 310—68)

The present invention relates to motor protective means and is more particularly concerned with improved means for protecting motors against abnormally high temperatures, such as caused by excessive current conditions in or loss of heat removal from the windings of the motor.

An object of the present invention is to provide improved thermal protection for motors of the type in which the protective means is mounted directly adjacent the motor winding so that the protective means can quickly sense the winding temperatures.

Another object of the invention is to provide a motor protective means which can be releasably mounted so that the protective means is in abutting relation to the motor and in firm, thermal juxtaposition with the motor winding.

Yet another object of the instant invention is to provide a means whereby a motor protective means may be quickly and simply detachably mounted so that the motor protective means as in abutting relation with the motor and in thermal juxtaposition to the motor windings for direct heat transfer.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

FIG. 1 is a sectional elevation view of a hermetically sealed compressor illustrating one exemplary arrangement according to the instant invention;

FIG. 2 is an enlarged fragmentary detailed view of the motor and motor protector shown in FIG. 1;

FIG. 3 is a front elevation of a motor protector and mounting means according to the instant invention;

FIG. 4 is a side elevational view of the motor protector and mounting means shown in FIG. 3;

FIG. 5 is a bottom plan view of the motor protector and mounting means shown in FIG. 3;

FIG. 6 is an elevational view, in section, of an exemplary thermally responsive device;

FIG. 7 is a sectional view taken along line 7—7 in FIG. 6; and

FIG. 8 is a sectional view taken along line 8—8 in FIG. 6.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The present invention contemplates the provision of a motor protector having a casing or housing formed of thermally conductive material and being provided with a spring clip mounting means which is adapted to mount the motor protector on a supporting means adjacent the motor so that the thermally conductive housing is in abutting relation with the motor and in thermally conductive juxtaposition with the motor winding to be protected. Although not limited thereto, the present invention is especially suited and particularly adapted for applications in compressor units, and particularly in hermetically sealed compressor units. It is to be understood, however, that the invention as to certain aspects is not limited to use with compressor motors and compressor units, etc., but may be used wherever found applicable. Such a typical exemplary application is shown in FIG. 1.

Referring to FIG. 1 of the drawing, the invention is shown in one form as applied to a typical small electric motor which is part of a compressor unit generally referred to by numeral 10. Compressor unit 10 may include a hermetically sealed housing 12 and motor generally referred to by numeral 14. Motor 14 includes a rotor 15, a stator 16 and at least one winding 17 to be protected by a motor protector generally referred to by numeral 20. Compressor unit 10 also includes a tubing or pipe 21 which is located adjacent motor 14. Tube 21 may, for example, be a suction tube and as will be described in greater detail below, also provides a support for mounting motor protector 20.

Referring now to FIGS. 3–5 of the drawing, protector 20 includes a housing 22 formed of a thermally conductive material, such as for example, copper or steel. Mounted within casing 22 is a thermally responsive electrical switching device which may be electrically connected in the circuit for the winding 17 so as to protect said winding against abnormally high temperature caused by excessive current conditions, etc. in a well-known manner. Electrical connections in the circuit may be made through terminals 24 and 26 in a well-known manner. Casing 22 is provided with a spring clip means generally referred to by numeral 28. Spring clip mounting means 28 is substantially J-shaped and includes a bent-over portion 29 at one free end thereof. Bent-over portion 29 is fixedly secured to casing 22 as by welding (as best seen in FIG. 5). The other free end of mounting means 28 is provided with a bent-over open-ended spring like clip portion 30, as best seen in FIG. 4. The clamp or spring clip portion 30 of the J-shaped spring clip member 28 has been shown as circular or curvilinear in configuration, but it should be understood that portion 30 may be of any convenient configuration so as to conform to the shape of the member to which it is to be detachably clamped or mounted. Bent tab portion 31 provided on the the spring portion 30 facilitates mounting of the clip on a supporting member such as tubing 21, as shown in FIGS. 1 and 2. It can thus be seen that to mount the protector 20 on the tube 21, it is only necessary to press the clip portion 30 over the tube, forcing tab portion 31 apart from the straight portion 29a of the mounting means 28 and the clip will then quickly be clamped about the tube 21.

The spring-like clip member 28 is preferably formed of a material having a relatively low thermal conductivity so as to prevent conduction of heat from the thermally responsive switching device 20 to the supporting member. The nature of attachment of the clip both to the can or housing 22 and to the supporting member further tends to minimize heat transfer between the thermally responsive switching device 20 and the supporting member. It will be noted that there is minimum surface-to-surface contact between the clip and the can and also between the clamp or spring clip portion 30 and the supporting member 21 which tends to minimize heat transfer therebetween.

Referring now to FIG. 2, it can be seen that when portion 30 is attached to the tube 21, the outer surface 32 of can 22 is maintained in abutting relation and in thermally conductive juxtaposition with the motor winding 17 which is to be protected. The spacing between tube 21 and the motor winding 17 (as best seen in FIG. 2) is such as to and move clip 28 upwardly (as best seen in dashed line portions in FIG. 3) so as to stress spring clip 28 and urge thermally responsive switch means 20 into firm abutting engagement or abutting contact with the motor winding. It can thus be seen that the spring clip 28, when mounted on the supporting member 21, bends or rotates about point 33 (see FIG. 3) the point of connection, to the motor protector 20 and is stressed so as to urge the motor protector 20 into firm abutting engagement with the motor winding. This arrangement provides a firm mounting for the motor protector wherein the thermally conductive housing is in good thermal contact with the motor winding and vibration and undesirable unintended dislodgement is obviated or at least minimized.

Thermally responsive motor protector 20 may take the form of a hermetically sealed thermally responsive switch, such as illustrated in FIGS. 6–8, and more fully described in a copending application, Serial No. 803,282, filed March 31, 1959, and assigned to the assignee of the instant application. Reference may be had to said copending application for specific details of construction of the hermetically sealed thermally responsive switching device illustrated in FIGS. 6–8.

Referring now to FIGS. 6–8, thermally responsive switch 20 includes a generally rectangular cup-shaped casing member 22 formed of a material having a high heat conductivity such as, for example, copper or steel. The open end of casing member 22 is closed by a header or cover member 40, flanges 42 and 44 providing respectively by these casing members being sealed together, as by welding, to provide a hermetically sealed casing. A section of glass 46 is bonded to the mutually adjacent portions of header member 40 and to each of terminals 24 and 26, thereby to support these terminals within apertures 48 and 50, respectively, of header member 40, with a conventional glass-to-metal seal.

A cup-shaped member 52 formed of a conventional material such as moldable, electrically insulating material is disposed within the casing of thermally responsive switch 20. A pair of headed studs 54 and 56 extend through interfitting apertures in cup-shaped member 52. Stud 54 is welded at one end to a strap 60 and stud 56 is welded at one end to a strap 62. Straps 60 and 62 are welded to terminals 26 and 24, respectively, thereby to support cup-shaped member 52 and the parts fixed with respect thereto, within the casing of thermally responsive switch 20 and electrically connect each of studs 54 and 56 to a respective terminal 26 and 24. At the distal end of each of studs 54 and 56 is a stationary contact 74 and 76, respectively. Threadedly engaged with a tapped hole 79 in cup-shaped member 52 is a post 80, which is secured in adjusted relation to cup-shaped member 52 by means of a lock nut 82. Post 80 includes a reduced-diameter portion 84 extending loosely through an aperture 86 in a thermally responsive device 90. Thermally responsive device 90 is loosely confined between a flange 92 and a headed-over portion 94 provided by the post 80. Thermally responsive device 90 is formed in a conventional manner of two or more layers or components having respectively different coefficients of thermal expansion so as to be snappable from a first position of stability to a second position of stability upon being heated to a predetermined temperature and snappable back to said first condition upon being cooled to a predetermined temperature. Thermostatic snap-acting disc 90 is electrically conductive and snap acting in response to temperature change. This element may be of the type disclosed in United States Letters Patent 1,448,240. Reference is hereby made to this patent for the details of structure and function of this type of thermostatic element.

Thermally responsive element 90 carries a pair of movable contacts 100 and 102, these movable contacts being engaged with stationary contacts 74 and 76 when the thermally responsive element is in said first condition in the solid-line position in FIG. 8 and being spaced from and electrically disconnected from contacts 74 and 76, respectively, when in said second position, as shown by the dashed line position in FIG. 8. Thermally responsive element 90 includes opposed ears 106 and 107 and, as clearly shown in FIG. 6, respectively interfit loosely with grooves 109 and 110 provided by member 52 thereby preventing substantial rotation of the thermally responsive element about post 80.

From the above it can be seen that the instant invention advantageously permits quick, simple and low-cost installation and mounting of a motor protective device on a motor and wherein said device is firmly mounted in good heat transfer relation to the motor winding to be protected. The spring-like clip mounting means 28 advantageously biases the motor protector into firm abutting relation with the motor or motor winding.

Further, the detachable nature of the mounting permits removal of the motor protector for replacement purposes, if necessary.

Dimensions of certain of the parts as shown in the drawing have been modified for the purposes of clarity of illustration.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. In combination, an electrical motor having at least one motor winding; a thermally responsive device operative to open an electrical circuit for said winding at predetermined conditions, said thermally responsive device having a thermally conductive casing; spring clip means interconnected with said casing and detachably mounting said thermally responsive device on means associated with said motor with said casing biased into abutting thermally conductive relation with respect to said winding.

2. In a compressor unit comprising an electric motor having at least one winding, a thermally responsive device for de-energizing said winding at predetermined conditions, said thermally responsive device having a thermally conductive casing, said thermally conductive casing having spring clip means secured thereto as by welding for detachably mounting said thermally responsive device on means associated with said electric motor with said thermally conductive casing in abutting thermally conductive relation with respect to said winding.

3. The combination as set forth in claim 2 and wherein said compressor unit is hermetically sealed and said casing encompasses said thermally responsive device and is hermetically sealed.

4. In a compressor unit comprising an electric motor having at least one winding, a thermally responsive device operatively connected for de-energizing said winding at predetermined conditions, said thermally responsive device having a thermally conductive casing, said thermally conductive casing having spring clip means secured thereto, for detachably mounting said thermally responsive device on tubing located adjacent said electric motor with said thermally conductive casing in abutting thermally conductive relation with said winding, said spring clip means comprising an elongated member formed of a material having a relatively low thermal conductivity, said spring clip being secured as by welding at one free end to said casing, the other end of said spring clip member being provided with an open-ended resilient clip means for mounting said casing on said tubing.

5. In combination, a hermetically sealed compressor unit for pumping the refrigerant of a refrigerating system, said unit including an electric motor having at least one winding, a thermally responsive device operatively connected for de-energizing said winding at predetermined conditions; said thermally responsive device having a hermetically sealed thermally conductive casing, said hermetically sealed thermally conductive casing having spring clip means secured thereto for detachably mounting said thermally responsive device on a supporting means in said compressor unit adjacent said motor with said hermetically sealed thermally conductive casing in abuting thermally conductive relation with said winding.

6. A thermally responsive switching device for de-energizing a winding of a motor at predetermined conditions; said switching device having a thermally conductive housing; a spring clip member disposed externally of said housing and secured at one portion thereof to said housing as by welding; and said clip member having means at another portion thereof for detachably mounting said thermally responsive switching device and said casing in abutting thermally conductive relation with respect to said winding.

7. An electrical switching device comprising a thermally responsive element adapted to open and close an electrical circuit at predetermined conditions; a thermally conductive housing enclosing said thermally responsive elements; a spring clip member disposed externally of said housing and secured at one portion thereof to said housing as by welding; said clip member having clamping means at another portion thereof for detachably mounting said thermally responsive switching device with said said casing in thermally conductive juxtaposition with an article whose temperature is to be sensed.

8. A thermally responsive switching device for de-energizing a winding of a motor at predetermined conditions; said switching device including a thermally conductive casing; a spring clip member disposed externally of said casing; said spring clip member having a bent tab portion secured to said casing as by welding; said clip member having another portion extending from said bent tab portion at an angle thereto; and said clip member having clamping means at the free end of said another portion for detachably mounting said thermally responsive switching device on a support member with said casing biased into abutting thermally conductive relation with said winding.

9. The device as set forth in claim 8 and wherein said spring clip is formed of a material having a relatively low thermal conductivity, to minimize heat transfer between said casing and support member.

10. A thermally responsive switching device for de-energizing a winding of a motor at predetermined conditions; said switching device having a thermally conductive casing; a spring clip member disposed externally of said casing; a portion of said spring member being substantially J-shaped; said spring clip member having a bent tap portion secured to said casing as by welding; said J-shaped portion extending from said bent tab portion at an angle thereto and biased for movement away from said casing; the free end of said J-shaped portion providing a resilient clamping means for detachably mounting said thermally responsive switching device on a support member with said casing resiliently biased into abutting thermally conductive relation to said winding.

11. The device as set forth in claim 10 and wherein said spring clip is formed of a material having a relatively low thermal conductivity, to minimize heat transfer between said casing and support member.

12. In a compressor unit comprising an electric motor having at least one winding; a thermally responsive switching device operatively connected for de-energizing said winding at predetermined conditions; said switching device including a thermally conductive casing; a spring clip member having a bent tap portion secured to said casing as by welding; a portion of said spring clip member being substantially J-shaped; said J-shaped portion extending from said bent tab portion at an angle thereto and biased for movement away from said casing; said compressor unit including a support member adjacent said motor winding; the free end of said J-shaped portion providing resilient clamping means detachably mounting said switching device on said support member, with said casing resiliently biased into abutting thermally conductive relation to said winding; and said spring clip member being formed of a material having a thermal conductivity which is lower than that of said casing for minimizing heat-transfer between said casing and support member.

References Cited in the file of this patent

UNITED STATES PATENTS

| 2,369,986 | Schaefer | Feb. 20, 1945 |
| 2,523,059 | Richert et al. | Sept. 19, 1950 |

FOREIGN PATENTS

| 768,413 | Great Britain | Feb. 13, 1957 |